US005190124A

United States Patent [19]

Haneda

[11] Patent Number: 5,190,124

[45] Date of Patent: Mar. 2, 1993

[54] BRAKE DISCS

[75] Inventor: Ichiro Haneda, Nagano, Japan

[73] Assignee: Nissin Kogyo Kabushiki Kaisha, Nagano, Japan

[21] Appl. No.: 773,968

[22] PCT Filed: Mar. 26, 1991

[86] PCT No.: PCT/JP91/00389

§ 371 Date: Nov. 18, 1991

§ 102(e) Date: Nov. 18, 1991

[87] PCT Pub. No.: WO91/14880

PCT Pub. Date: Oct. 3, 1991

[30] Foreign Application Priority Data

Mar. 26, 1990 [JP] Japan .............................. 2-30684[U]

[51] Int. Cl.5 .............................................. F16D 65/12

[52] U.S. Cl. ........................... 188/218 XL; 188/18 A; 188/218 A; 188/264 G; 188/251 A; 301/35.62

[58] Field of Search ........ 188/218 XL, 218 R, 218 A, 188/18 A, 264 G, 250 G, 250 B, 250 R, 73.2, 73.1, 71.1, 251 A; 301/63 PW, 65, 9 DN, 6 WB, 6 E, 105 R, 6 CS, 63 R; 295/11, 1, 33, 35; 192/107 R, 70.13

[56] References Cited

U.S. PATENT DOCUMENTS

| | | | |
|---|---|---|---|
| 2,753,959 | 7/1956 | Johnson | 188/218 XL |
| 3,513,949 | 5/1970 | Klassen et al. | 188/218 XL |
| 3,530,960 | 9/1970 | Otto et al. | 188/218 XL |
| 3,877,551 | 4/1975 | Gebhardt et al. | 188/218 XL |
| 4,004,661 | 1/1977 | Airheart et al. | 188/218 XL |
| 4,102,443 | 7/1978 | Kohler et al. | 301/6 E X |
| 4,280,598 | 7/1981 | Pollinger | 188/218 XL |
| 4,742,948 | 5/1988 | Fisher et al. | 188/251 A X |
| 4,848,521 | 7/1989 | Izumine | 188/218 XL |

FOREIGN PATENT DOCUMENTS

| | | | |
|---|---|---|---|
| 0062774 | 10/1982 | European Pat. Off. | 188/218 XL |
| 0293868 | 12/1988 | European Pat. Off. | 188/218 XL |
| 0419263 | 3/1991 | European Pat. Off. | 188/218 XL |
| 2828109 | 1/1980 | Fed. Rep. of Germany | 188/218 XL |
| 438947 | 9/1948 | Italy | 188/18 A |
| 50-42302 | 12/1975 | Japan . | |
| 61-241538 | 10/1986 | Japan . | |
| 0127526 | 6/1987 | Japan | 188/264 G |
| 64-17041 | 1/1989 | Japan . | |
| 2136921 | 9/1984 | United Kingdom | 188/218 XL |

*Primary Examiner*—Douglas C. Butler
*Attorney, Agent, or Firm*—Armstrong, Westerman, Hattori, McLeland & Naughton

[57] ABSTRACT

This invention relates to a floating type automotive brake disc having a disc hub and a friction disc combined with a very small clearance therebetween. In the brake disc according to this invention, the friction disc (14) is fixed to the disc hub (10) by a collar (16) inserted through them, a connecting bolt (17) inserted through the collar (16) and a nut (18) to be fitted to the bolt (17). The collar has a annular ridge (16) on the circumference thereof at substantially the middle for defining a clearance between the disc hub (10) and the friction disc (14). The friction disc is supported between the outer lateral side (16*b*) of the annular ridge (16*a*) and the head (17*a*) of the connecting bolt (17). The length of the shaft (16*e*) protruding from the inner lateral side (16*d*) of the connecting bolt (17) is greater than the thickness of the disc hub (10). This constitution can cope with any change or increase in the thickness of the friction disc (14) to cause no strain on the braking surface, in turn, no fluctuation in the braking action.

3 Claims, 5 Drawing Sheets

2
14
17
17
19
19
12
2
10
11
11
11
12
12
17
19

BRAKE DISCS

FIELD OF TECHNOLOGY

This invention relates to a floating type automotive brake disc.

BACKGROUND OF THE TECHNOLOGY

In the floating type brake disc, a disc hub and a friction disc, formed separately, are combined with each other with a very small clearance therebetween. Accordingly, this type of brake disc enjoys an advantage that its braking action does not fluctuate since the friction disc undergoes uniform heat expansion when exposed to the frictional heat generated by braking operation to suffer no strain on the braking surface thereof and further the disc is not constrained by the disc hub.

A prior art floating type brake disc is disclosed, for example, in Japanese Provisional Utility Model Publication No. 46539/1989. In the disclosed brake disc, a plurality of connecting members are formed on the disk hub and friction disc, respectively, and the thickness of each opposing pair of connecting members are reduced to ½ so that the thickness of the two connecting members may be ½ the thickness of the disc hub and that of the friction disc, respectively. Connection holes having different inner diameters are also formed through these connecting members, respectively, and each pair of connecting members are combined with each other in such a way that the reduced portions may be overlapped and that the connecting holes thereof may communicate to each other. A stepped connecting pin is inserted through the combined connecting holes of the connecting members, and after a washer is fitted to the point of the connecting pin, the point of the pin is caulked. Since the disc hub and the friction disc are thus bound elastically between the head of the connecting pin and the washer, the head of the connecting pin and the washer deflect if the friction disc undergoes heat expansion and can cope with the fluctuation or expansion in the thickness of the friction disc.

However, the above structure suffers a problem that the skill of an expert is required for the caulking operation since the friction disc may not be supported evenly unless the connecting pins are caulked with an equal power, and that it is troublesome to remove the connecting pins when the friction disc is replaced.

DISCLOSURE OF THE INVENTION

It is an object of this invention to provide a brake disc in which a friction disc can easily be connected to the disc hub.

This invention is directed to a brake disc comprising: a disc hub which rotates as the wheels rotate; a friction disc to be fixed to the disc hub; a collar inserted through connecting holes formed through the disc hub and the friction disc, respectively; and a connecting means for fixing the friction disc to the disc hub, consisting of a connecting bolt penetrating through the collar and a nut to be fitted to said bolt; wherein said collar has an annular ridge (large diameter portion) on the circumference thereof at substantially the middle for defining a clearance between the disc hub and the friction disc; either said friction disc or said disc hub is supported between one lateral side of the annular ridge and the head of the connecting bolt or the nut; and the length of the shaft protruding from the other lateral side of the annular ridge is greater than the thickness of the remaining one of the friction disc and the disc hub.

In this construction, either the friction disc or the disc hub is supported between the annular ridge of the collar and the head of the bolt or the nut and secured on the collar, so that the remaining one of the friction disc and the disc hub can cope with the fluctuation or increase in thickness of the friction disc caused by heat expansion, since the length of the shaft protruding from the other lateral side of the annular ridge is greater than the thickness of the remaining one of the disc hub and the friction plate, causing no strain on the braking surface of the friction disc, in turn, no fluctuation in the braking action.

On the other hand, since the friction disc is combined with the disc hub via such bolt-and-nut connecting means, the friction disc can easily be fixed or replaced.

If the washer and the collar included in the connecting means are made of a heat insulating material such as ceramics, and if the friction disc is made of a carbon-carbon composite material, the heat of the friction disc generated by braking operation is prevented from being transmitted to the disc hub. Accordingly, the friction disc made of a carbon-carbon composite material can be heated quickly by the frictional heat generated by the braking operation since it has a higher coefficient of friction in a higher temperature range than in a lower temperature range, whereby the braking action can be exhibited stably.

PREFERRED EMBODIMENTS OF THE INVENTION

This invention will now be described referring to the attached drawings.

Figure 1:
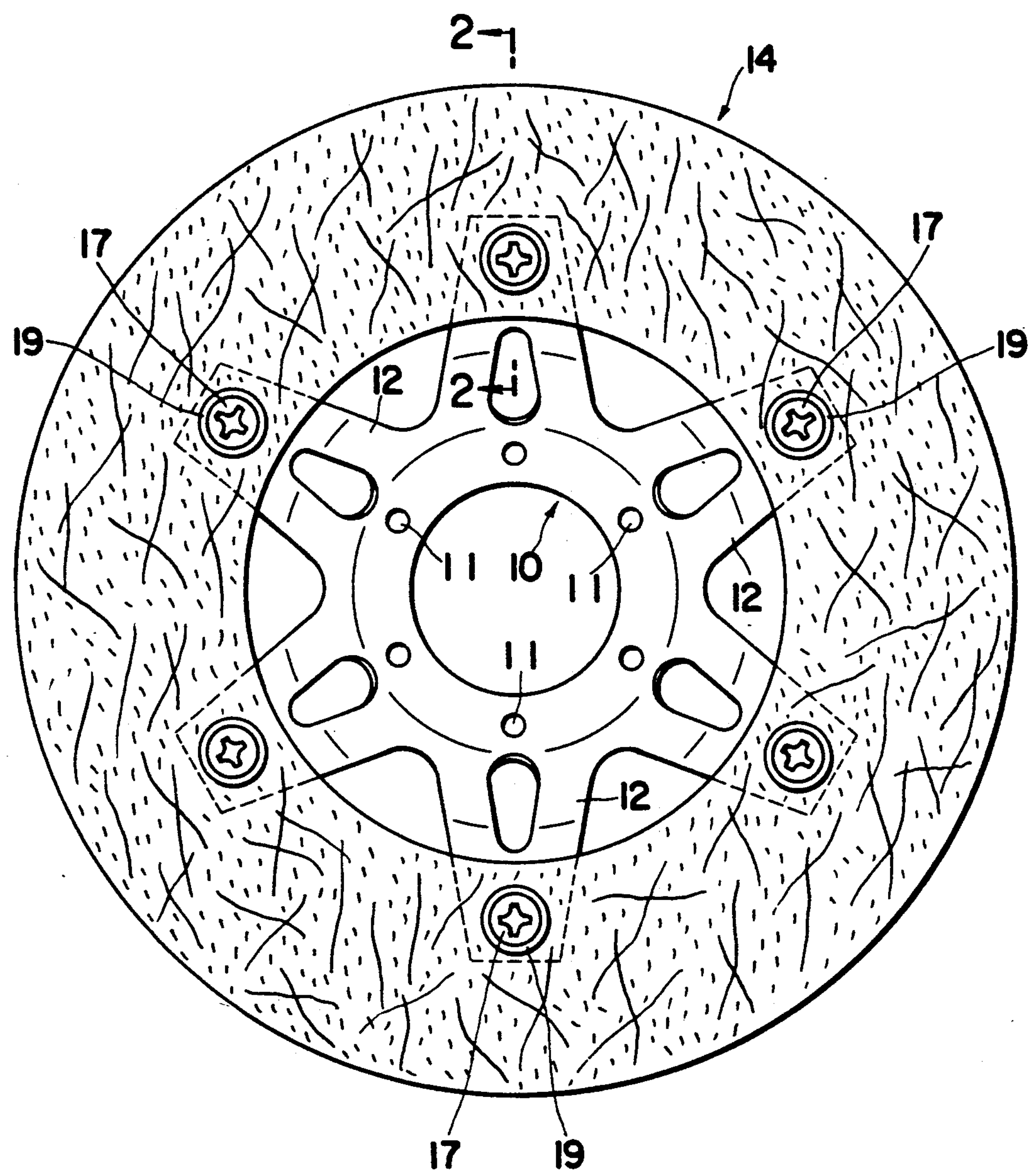
FIG. 1 shows a front view of an embodiment of the brake disc according to this invention.
Figure 2:
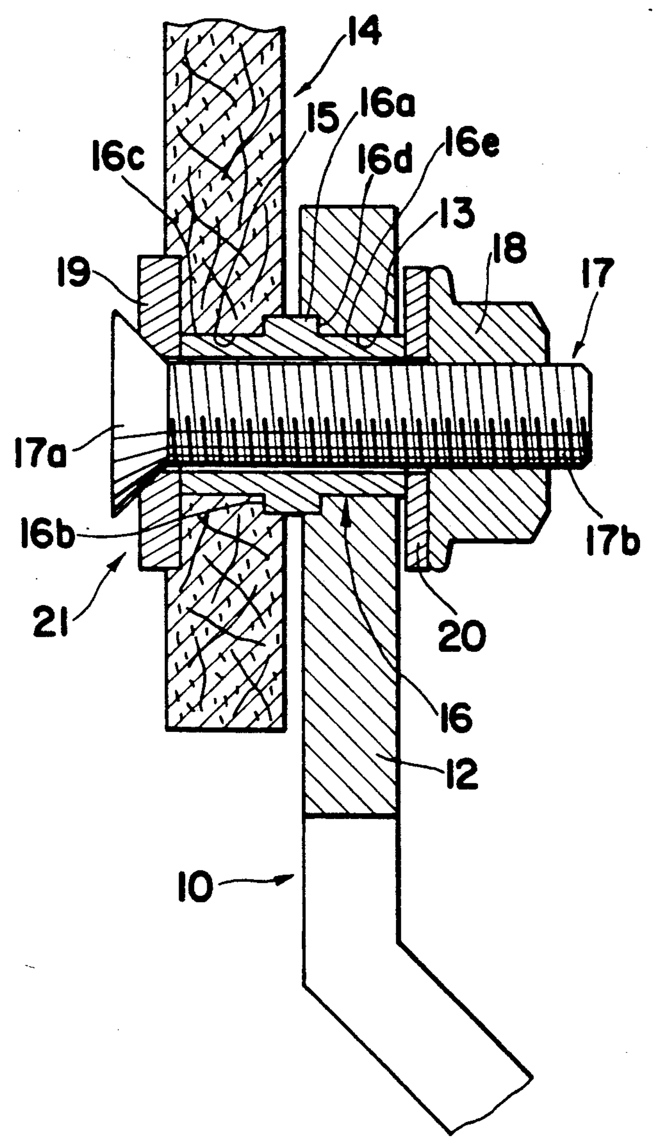
FIG. 2 shows a cross section taken along the line 2—2 in FIG. 1.

FIGS. 1 and 2 show a first embodiment of the brake disc according to this invention.

The disc hub 10 which rotates as the wheels rotate has a plurality of bolt holes 11 for fixing the hub to an axle shaft or wheel hub at regular intervals along the inner perimeter and meter of the disc hub and six spokes 12 radially protruding at regular intervals from the outer perimeter of such disc hub. A connecting hole 13 is formed at the free end of each spoke 12.

A friction disc 14 to be fixed to the spokes 12 is made of a carbon-carbon composite material and has an annular form. The friction disc 14 has six connecting holes 15 along the inner perimeter at the positions corresponding to the connecting holes 13 of disc hub 10.

The spokes 12 and the friction disc 14 are combined in such a way that the free end portions of the spokes 12 may overlap with the inner circumferential portion of the friction disc 14, and a collars 16 is inserted through each pair of connecting holes 13 and 15. The collar 16 is made of a heat insulating material such as ceramics. The friction disc 14 is fixed to each spoke 12 of the disc hub 10 by a connecting means 21 consisting of a connecting bolt 17 screwed from the friction disc side to penetrate through the collar 16, a nut 18 to be fitted to the connecting bolt 17 and washers 19 and 20. The washers 19 and 20 are made of a heat insulating material such as ceramics.

An annular ridge 16a is formed on the circumference of the collar 16 at around the middle for defining a clearance between the disc hub 10 and the friction disc 14. The shaft 16c, protruding from the outer lateral side of the annular ridge 16a, is inserted through the connection hole 15 of the friction disc 14. Thus, the friction disc 14 is fixed to the collar 16 as supported between the outer lateral side 16b of the annular ridge 16 and the head 17a of the connecting bolt 17 via the washer 19.

The length of the shaft 16e protruding from the inner lateral side of the annular ridge 16a is designed to be greater than the thickness of the disc hub 10. The shaft 16e is inserted through the connecting hole 13 of the disc hub 10. A nut 18 is fitted via the washer 20 to the tip 17b of the connecting bolt 17 protruding from the free end of the shaft 16e.

The collar 16 can slide, with connecting bolt 17 relative to the disc hub 10, because the length of the shaft 16e of the collar 16 is greater than the thickness of the disc hub 10. Accordingly, when the thickness of the friction disc 14 is increased due to heat expansion caused by the frictional heat generated by a braking operation, the head 17a of the connecting bolt 17 expands outward via the washer 19, whereby the collar 16 is slid to the left in FIG. 2 via the nut 18 and washer 20 relative to the disc hub 10. Consequently, any strain on the braking surface of the friction disc 14 can be prevented to cause no fluctuation in the braking action.

Besides, since a clearance is defined between the friction disc 14 and the disc hub 10 and the friction disc 14 is supported between the annular ridge 16a of the collar 16 made of a heat insulating material and the washer 19 also made of a heat insulating material, the heat of the friction disc generated by the braking operation is prevented from being transmitted to the disc hub 10.

Therefore, since the friction disc made of a carbon-carbon composite material has a higher coefficient of friction in a higher temperature range than in a lower temperature range, the friction disc 14 can quickly be heated by the frictional heat generated by the braking operation to exhibit a stable braking action.

Moreover, the friction disc 14 is combined with the disc hub 10 by means of the connecting bolt 17 and nut 18, the friction disc 14 can easily be fixed to the disc hub 10 or replaced.

Figure 3:
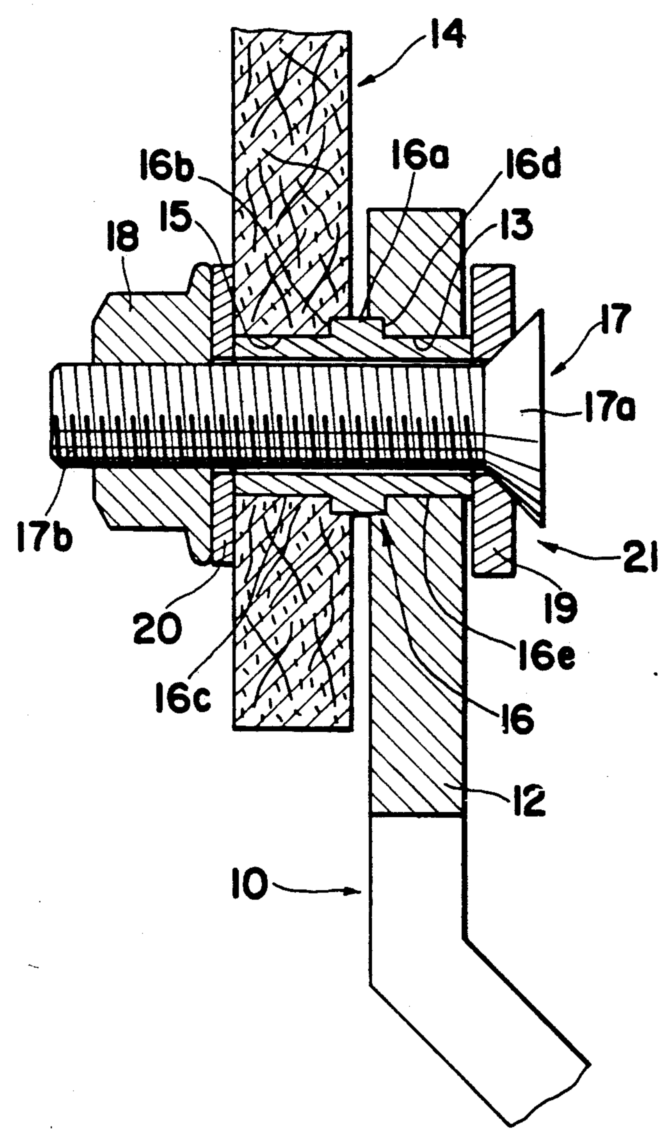
FIGS. 3, 4 and 5 each show, in cross section, the pertinent portions of other embodiments of the brake disc according to this invention.

FIG. 3 shows a second embodiment of this invention. Since this embodiment employs the same constituents as used in the first embodiment, description is made using the same reference numerals.

In this embodiment, a connecting bolt 17 is inserted through the collar 16 from the disc hub side and a nut 18 is fitted to the bolt 17 from the friction disc side.

Accordingly, when the thickness of the friction disc 14 is increased due to heat expansion caused by the frictional heat generated by the braking operation, the nut 18 is pressed outward via the washer 20, whereby the collar 16 is slid to the left in FIG. 2 via the head 17a of the connecting bolt 17 and the washer 19 relative to the disc hub 10. Consequently, any strain on the braking surface of the friction disc 14 can be prevented to cause no fluctuation in the braking action.

Figure 4:
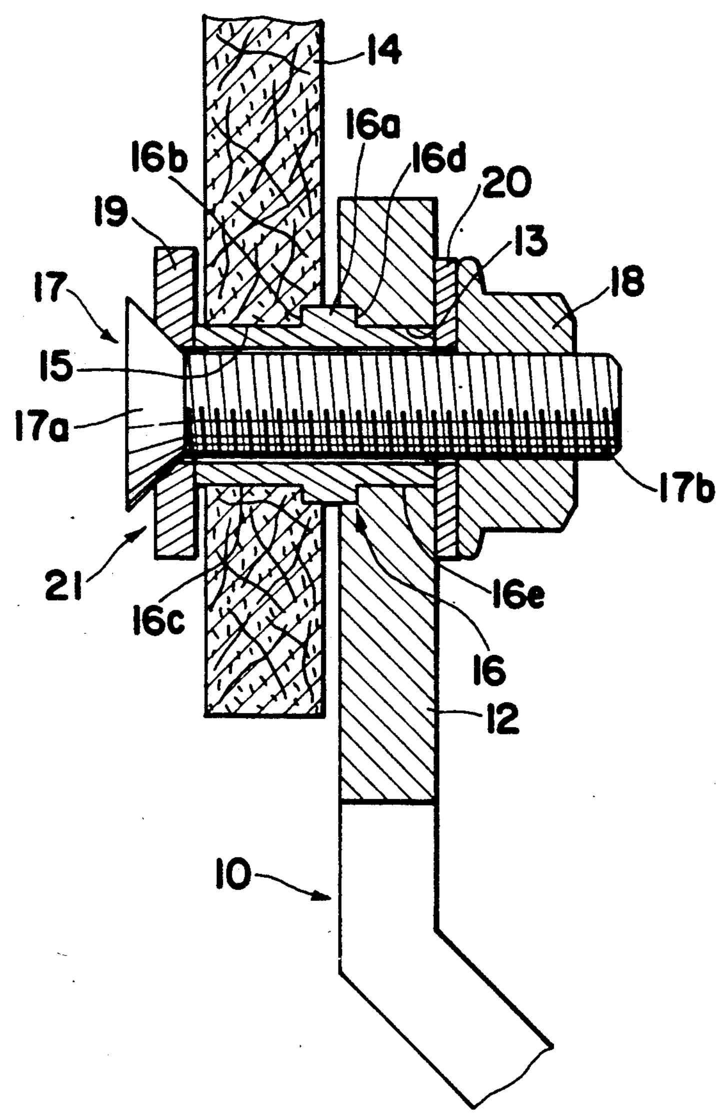

FIG. 4 shows a third embodiment of this invention. Since this embodiment employs the same constituents as used in the first embodiment, description is made using the same reference numerals.

In this embodiment, the length of the shaft 16c protruding from the outer lateral side 16b of the annular ridge 16a of the collar 16 is greater than the thickness of the friction disc 14. The shaft 16c is inserted through the connecting hole 15 of the friction disc 14. A connecting bolt 17 is inserted via a washer 19 through the collar 16 from the free end of the shaft 16c with a nut 18 being fitted on the tip 17b thereof via another washer 20.

The shaft 16e protruding from the inner lateral side 16d of the annular ridge 16a of the collar 16 is inserted through the connecting hole 13 of the disc hub 10, and the disc hub 10 is fixed to the collar 16 as supported between the inner lateral side 16d of the annular ridge 16a and the nut 18 fitted on the tip 17b of the connecting bolt via the washer 20.

When the thickness of the friction disc 14 is increased due to heat expansion caused by the frictional heat generated by the braking operation, the increased thickness can be absorbed by the clearance defined between the washer 19 and the friction disc 14, since the length of the shaft 16c of the collar 16 is greater than the thickness of the friction disc 14. Accordingly, any strain on the braking surface of the friction disc 14 can be prevented to cause no fluctuation in the braking action.

Figure 5:
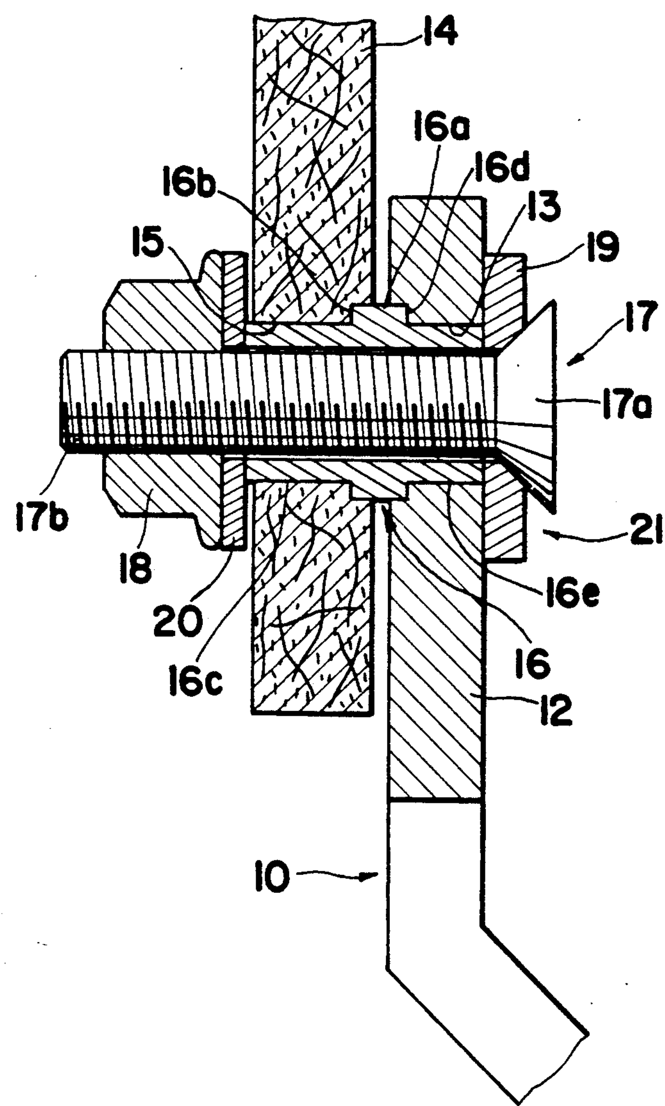

FIG. 5 shows a fourth embodiment of this invention. Since this embodiment employs the same constituents as used in the first embodiment, description is made using the same reference numerals.

This embodiment uses the same collar 16 as used in the third embodiment, in which a connecting bolt 17 is inserted from the disc hub side and a nut 18 is fitted to the bolt 17 from the friction disc side.

Therefore, when the thickness of the friction disc 14 is increased due to heat expansion caused by the frictional heat generated by the braking operation, the increased thickness can be absorbed by the clearance defined between the washer 20 and the friction disc 14, since the length of the shaft 16c of the collar 16 is greater than the thickness of the friction disc 14. Accordingly, any strain on the braking surface of the friction disc 14 can be prevented to cause no fluctuation in the braking action.

Incidentally, while a friction disc 14 made of a carbon-carbon composite material is used in the above embodiments, it may be made of a metallic material such as cast iron.

I claim:

1. A brake disc comprising:

a disc hub which rotates as a wheel on which said hub is mounted rotates;

a friction disc mounted on said disc hub;

a collar inserted through connecting holes formed through said disc hub and said friction disc, respectively; and a connecting means for fixing said friction disc to said disc hub and consisting of a connecting bolt penetrating through said collar, said bolt having a head at one of its ends and a nut at its opposite end; wherein said collar has an annular ridge on a circumference of said collar at substantially a middle of said collar and defining a clearance between said disc hub and said friction disc; one of said friction disc and said disc hub being supported between one lateral side of said annular ridge and one of said head of said connecting bolt and said nut, the length of said collar between the other lateral side of said annular ridge and the remaining one of said friction disc and said disc hub and the other of said head of said connecting bolt and said nut being greater than the thickness of said remaining one of said friction disc and said disc hub.

2. The brake disc according to claim 1, wherein said connecting means further includes washers; said washers and said collar being made of a heat insulating material, and said friction disc is made of a carbon-carbon composite material.

3. The brake disc according to claim 2 in which said heat insulating material is ceramic.

* * * * *